Patented June 14, 1938

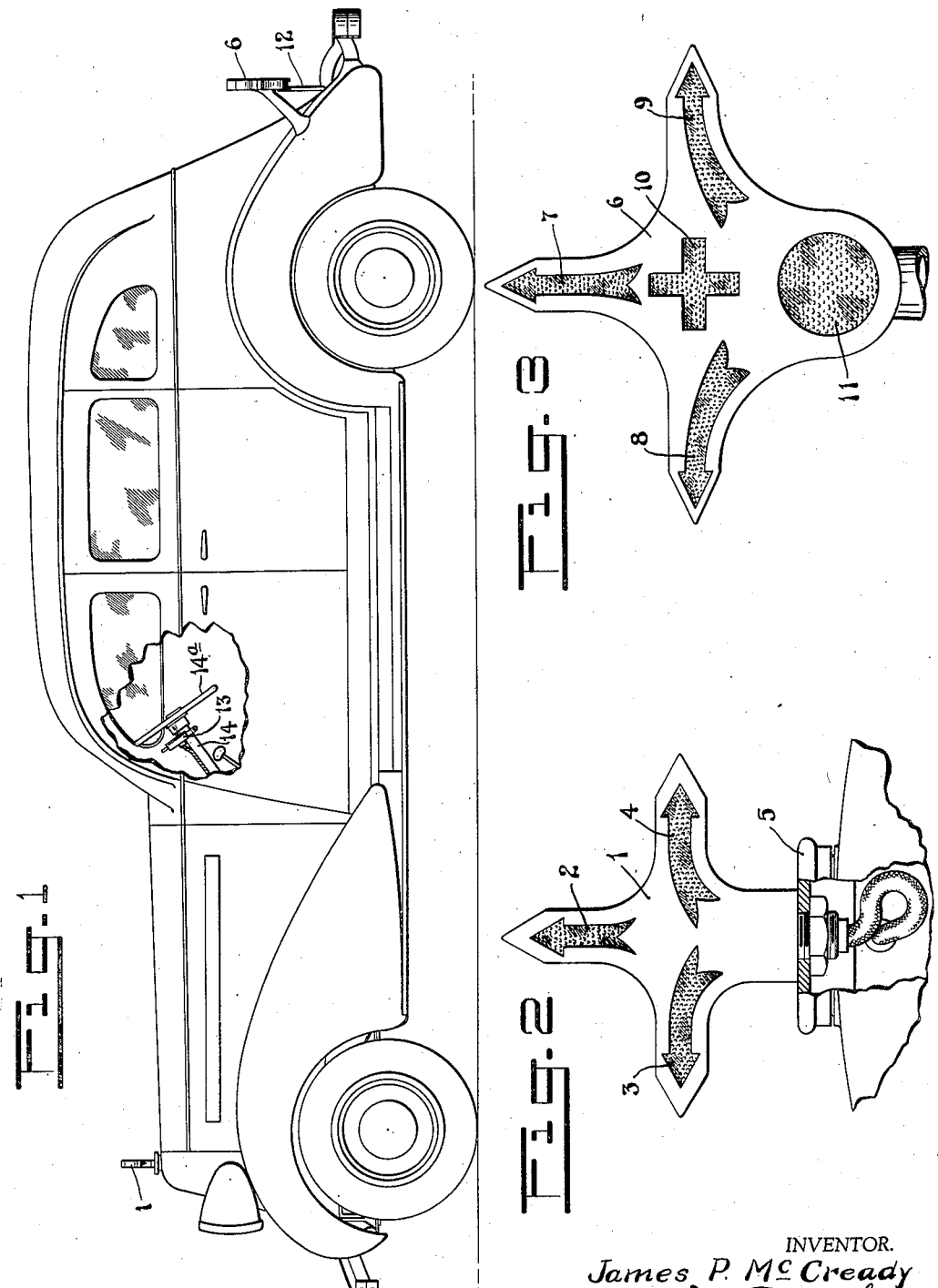

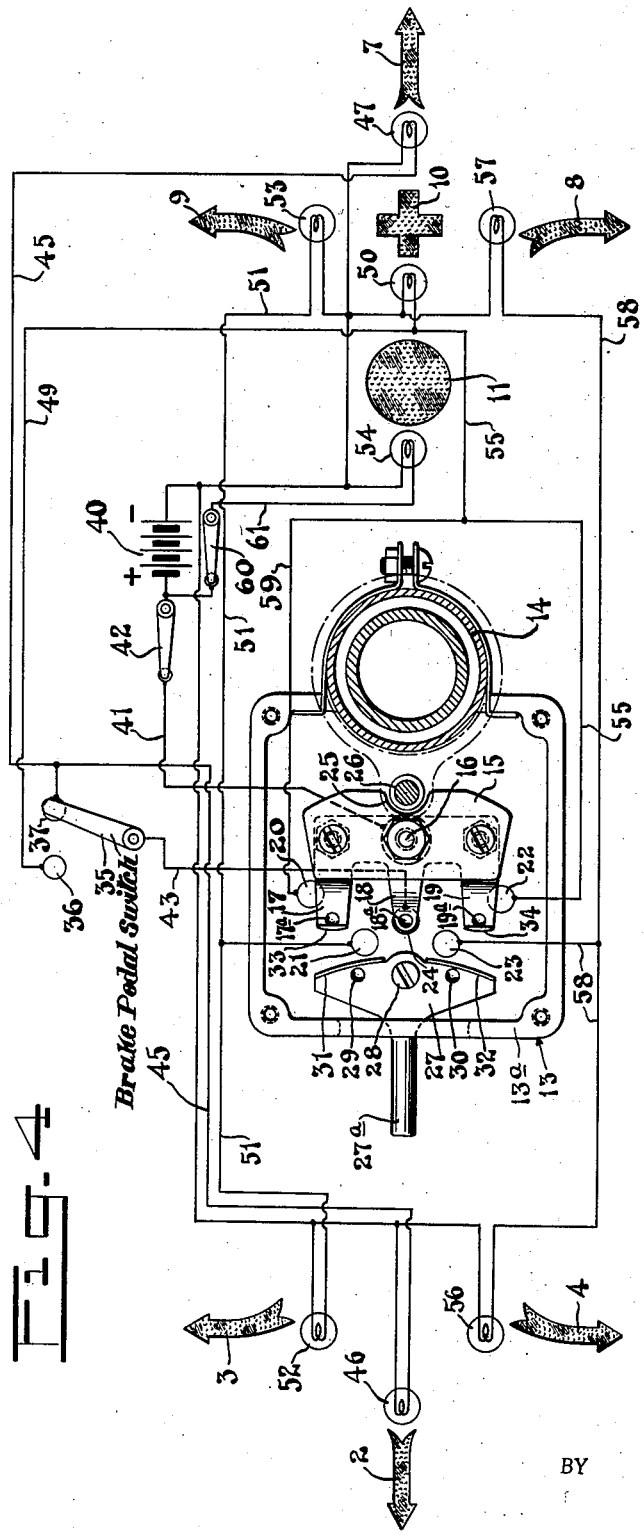

2,120,288

UNITED STATES PATENT OFFICE 2,120,288

DIRECTION INDICATING SYSTEM

James P. McCready, New York, N. Y.

Application May 28, 1936, Serial No. 82,193

3 Claims. (Cl. 177—337)

This new and useful improvement is intended primarily for use upon automobiles.

Its object is the accurate indication at all times of the movements of the vehicle for the benefit of other motorists, traffic police and pedestrians in a more effective manner than is at present possible. The constantly increasing number of motor vehicles traveling at high speed makes it increasingly important that a driver's intention should at all times be clearly evident.

It is also important that the signals should be supplementary to the usual signals, such as the stop light, since the driving public has become so familiar therewith that the mere substitution of one signal for another without more is likely to pass unnoticed.

By this invention the motor vehicle is provided with a signal which will be instinctively recognized as an indication that no turn or other deviation from a normal course is intended and also signals which not only give warning that a turn is being or is to be made but give it in such a way that even inattentive drivers will be apprised that something more than the usual stop signal has been given.

The entire system is automatically controlled by a switch operated by turning the steering wheel but this control is supplemented by a manual control whereby turning signals can be shown as long in advance as desired without interfering with their subsequent automatic operation.

It is realized that somewhat similar signalling systems have been devised heretofore but they lack certain features of this invention which are of extreme importance in assuring attention to the signals and quick and certain recognition of what they mean. The success or failure of signal systems depends upon such small details since otherwise, in the multitude of tail lights, stop lights, roadside signs, etc., direction signals will not be recognized for what they are.

One form of the device, selected for illustrating and describing the invention, is shown in the accompanying drawings, of which Figure 1 is a side elevation of an automobile showing the signal devices of this invention mounted upon the front and rear of the machine, and also the location of the operating switch upon the steering column;

Fig. 2 is a reduced elevation of the front signal mounted upon the radiator cap and viewed from the front of the machine;

Fig. 3 is a reduced elevation of the rear signal viewed from the rear of the machine; and Fig. 4 is a view of the operating switches on the steering column, the stop light switch, the signals and the electric circuits.

As shown in Fig. 2 the front signal 1 consists of a housing provided with three arrow shaped openings 2, 3 and 4 pointing upward, to the left and to the right respectively. The opening 2 is covered preferably with a green glass and openings 3 and 4 are covered preferably with red glass. Each is separately illuminated by an electric lamp, as will be described. The signal 1 may be mounted upon the radiator cap 5, as shown, or upon any other part of the machine from which it can be clearly observed by one facing the machine. If desired similarly shaped and colored openings may be provided in the back of the housing so that the driver will be advised at all times that the signal system is operating properly and also that the drivers of other cars traveling alongside in the same direction will have the benefit of the signals given.

The rear signal shown in Fig. 3 may consist of a similar housing and three arrows 7, 8, and 9 similar to arrows 2, 3 and 4 respectively, of the front signal and similarly colored green, red and red respectively. In addition there is provided a warning light 10 preferably amber, and a red tail light 11. Each of these signals is illuminated by its individual lamp. If desired, the number plate 12 may be attached below the tail light in the usual way and illuminated by the tail light lamp through an uncolored window in the bottom of the signal housing.

The automatic operating switch and auxiliary manual switch generally shown at 13 in Fig. 1 may be attached to the steering column 14 immediately below the steering wheel 14ᵃ where the manual switch may be easily reached. The stop light switch 35 (shown diagrammatically in Fig. 4) may be placed in the usual position and operated in the usual way by the foot brake pedal.

The automatic and manual switches 13 are contained within a single housing 13ᵃ of insulating material in the form shown. The automatic switch in the form shown in Fig. 4 consists of a block of insulating material 15 swingable upon a pivot 16 and carrying three electrically connected contact fingers 17, 18 and 19. Housing 13ᵃ also carries stationary contacts 20 and 21 with which contact point 17ᵃ of finger 17 is engageable, contacts 22 and 23 with which contact point 19ᵃ of finger 19 is engageable, and contact 24 with which contact point 18ᵃ of finger 18 is engageable.

Block 15 is also provided with a notch 25 into which projects a pin 26 which is attached eccentrically to steering column 14 or to the nut of the steering wheel 15. By this means block 15 will be rocked one way or the other whenever the steering wheel is turned sufficiently. Sufficient play of pin 26 in notch 25 is provided so that the steering wheel may be turned the amount usually required for straight ahead driving without rocking block 15.

The parts described are so arranged that when the steering wheel is in position for straight ahead driving finger 18 only will be in contact with a fixed contact (24). Whenever a sufficient degree of turning of the steering wheel occurs, however, contact finger 17 will be rocked into engagement with either contact 20 or 21 and finger 19 into engagement with either contact 22 or 23, depending upon the direction of rotation, and finger 18 will break its connection with contact 24.

With the automatic switch in the straight ahead position shown in Fig. 4, either one of the fingers 17 or 19 may be brought into electrical connection with contacts 21 or 23 respectively, by means of a manual switch 27 which is also shown as mounted upon a pivot 28 in housing 13ª. This switch which is made of conducting material is provided with contact points 29 and 30 engageable with contacts 21 and 23 respectively, and also with contact flanges 31 and 32 adapted to engage with corresponding flanges 33 and 34 on fingers 17 and 19. Thus by rocking manual switch to the right or left by its lever 33 connection may be made between one or the other of these fingers 17 and 19 and contacts 21 and 23 even when the steering wheel is in straight ahead position.

The warning signal switch consists essentially of a swingable arm 35 adapted to contact with fixed contact 36 when the foot brake pedal is pressed down and with another fixed contact 37 when the pedal is released.

The general mode of operation of the various signals is as follows. The tail light 11, for the sake of compactness and convenience, is incorporated in the rear signal 6. It has no other connection with the signal system and for that reason is in a circuit of its own controlled by the usual switch, as will hereinafter be described.

During straight ahead driving green arrows 2 and 7 are constantly illuminated except when the warning signal switch 35 is operated by depressing the foot brake pedal to cause the warning signal 10 to glow amber. When making a turn, however, control of the warning signal 10 is transferred from the warning signal switch to the automatic switch and the warning signal is illuminated through it to indicate that following cars should proceed with caution. This occurs when the wheels have been turned just far enough to begin the turn. Simultaneously green arrows 2 and 7 are extinguished. Additional turning of the wheels to complete the turn causes the lighting of either arrows 3 and 9 or 4 and 8 in the front and rear signals respectively, depending upon whether the turn is being made to the right or left. Thus, when a turn or any deviation greater than that which ordinarily occurs in straight ahead driving, following cars are first warned to stop or to proceed cautiously and are then advised that the turn is being made in one direction or the other.

As already stated, the mere substitution of a direction arrow for a stop light is often overlooked and the arrow is taken to be simply a stop light. In consequence, collisions are likely to occur since following drivers are insufficiently warned that a sharp change of direction is to be made by the preceding car. By this system a cautioning signal is first given and then maintained while an additional direction signal is also given so that no driver can have any possible excuse for failing to understand the intentions of the car ahead.

Although a certain amount of turning of the wheels is required for the automatic operation of the warning signal as described above, this need not be so great as to turn the car from its straight course to a material degree. The real turning occurs only after the illumination of the direction arrow.

When the wheels are again straightened out the signal lights are extinguished in the reverse order, first the arrow followed by the warning signal and the green straight ahead arrows are again illuminated.

It is often desirable to indicate that a turn is contemplated an appreciable time before it is to be made. This is particularly true on country roads where high speed is the rule and intersections infrequent. This is the purpose of the manual switch which has been described. While running straight ahead with only the green arrows illuminated, the driver may at any time indicate in advance that a turn is contemplated by swinging the manual switch lever 27ª in the direction of the proposed turn. This will cause the illumination of either red direction arrows 3 and 9 or 4 and 8 and will indicate a turn to right or left as the case may be. However, since green straight ahead arrows 2 and 7 remain illuminated and the warning signal 10 remains dark following cars are advised that the car ahead has neither altered its course nor slowed down but contemplates a turn to the right or left, as the case may be, some distance ahead. When the turn actually begins the red direction arrows are extinguished for an instant, then the warning signal comes on followed by the arrow again. This, together with the extinguishing of the green straight ahead signals advises, beyond all question, that the turning manoeuvre signalled in advance is actually taking place. The rocking of the automatic switch during the turn will also automatically swing the manual switch back to its inoperative position so that the automatic switch is in full control again.

In case the driver inadvertently moves the manual switch in the wrong direction an incorrect signal will be given. However, he will be made immediately aware of this by the lighting up of the wrong arrow in the rear face of the front signal and, in any event, when the turn is actually begun this erroneous signal will be extinguished by the breaking of the contact between the flange of the automatic signal finger and the corresponding flange of the manual switch and the correct signal given by the automatic switch as previously described.

In this way every change in direction is indicated by a distinct signal so that everyone on the road can know what the car is doing, what it intends to do and when it is doing it.

The electric circuits required are shown in Fig. 4 as complete wire circuits. It will be understood, of course, that single wire circuits may be employed if desired, the return circuits being some common ground.

As shown, the source of circuit is the usual storage battery 40 with which all cars are equipped. The output of battery 40 is led by wire 41 to automatic switch fingers 17, 18 and 19. The ignition switch 42 is included in this lead so that the signal system is automatically switched on with the switching on of the ignition circuit. The current for all of the signals with the exception of the tail light, is supplied through lead 41 and the three fingers 17, 18 and 19.

The straight ahead green arrows 2 and 7 are illuminated as described when the car is running straight ahead through the circuit provided by lead 41 contact finger 18, fixed contact 24, lead 43, warning signal switch 35, contact 37, lead 45 to lamps 46 and 47 of green arrows 2 and 7 respectively. As long as the car is running straight ahead and the foot brake is not applied these green arrows will glow continuously.

If the foot brake is applied the warning signal switch 35 will be swung out of contact with contact 37 thus causing the extinguishment of green arrows 2 and 7 and into contact with contact 36 completing the circuit to warning signal lamp 50 through lead 49. As soon as the foot brake is released the warning signal goes out and the green straight ahead arrow circuit is re-established.

To give advance warning that a turn is contemplated manual switch lever 27ª is swung to the right or left to indicate the corresponding turn. When it is swung to the right its contact point 29 will engage with contact 21 and its flange 31 will engage with flange 33 of contact finger 17. From contact 21 a wire 51 leads to lamps 52 and 53 of right direction arrows 3 and 9. Thus these arrows will be illuminated without extinguishing the green arrows 2 and 7 or affecting the normal action of the warning signal already described. If the foot brake is applied before turning the green arrows will be extinguished and the warning signal illuminated through the action of the warning signal switch without affecting the previously lit direction arrows.

When the turn is actually made the swinging of finger 17 will first move the manual switch contact 29 from fixed contact 21 and the circuit to right direction arrows 3 and 9 will be broken. However, the warning signal will be illuminated immediately therefore and the green arrows extinguished. This is accomplished by designing the automatic switch so that finger 19 will make contact with fixed contact 22 by a slight swing of the steering wheel over that required to break the connection of the manual switch with contact 21, as described above and so that finger 18 will break its contact with fixed contact 24. Warning signal lamp 50 is connected to contact 22 by lead 55.

A further turning of the steering wheel to the right will establish contact between finger 17 and fixed contact 21 so that right direction arrows 3 and 9 will be illuminated again without extinguishing the warning signal 10, the switch being so designed that contact between finger 19 and fixed contact 22 is maintained. The lead connecting fixed contact 21 and the right direction arrows 3 and 9 is the wire 51 previously mentioned. During these operations finger 18 has moved away from fixed contact 24 so that the green arrows 2 and 7 have gone out.

To indicate manually in advance a turn to the left the lever 27ª of the manual switch is swung to the left to cause contact point 30 to engage with fixed contact 23 which is in circuit with lamps 56 and 57 of left direction arrows 4 and 8 through lead 58. Swinging the manual switch in this manner will also cause its flange 32 to engage with flange 34 of finger 19, completing the circuit to the battery through lead 41. Green arrows 2 and 7 remain lit since finger 18 is still in contact with fixed contact 24.

When the turn is actually begun the initial swinging of the steering wheel will cause finger 19 to push the manual switch back to its normal position and the left direction arrows 4 and 8 and green arrows 2 and 7 will be extinguished. However, further turning will cause contact point 17ª of finger 17 to make contact with fixed contact 20 from which leads 59 and 55 run to the warning signal lamp 50 and a still further turning of the wheel will cause finger 19 to make contact with fixed contact 23 to complete the circuit to the left direction arrows 4 and 8. Here also the design of the switch is such that the warning signal circuit remains closed while the left direction arrows 4 and 8 are illuminated.

The return lead of the above circuits are shown in Fig. 4 but require no description since they are conventional. The tail light 11 also has its own conventional circuit indicated by lead 61 and switch 60.

Thus by the mere turning of the steering wheel and the normal operation of the foot brake, all of the movements of the car are signalled to following cars. Application of the foot brake without turning causes the darkening of the green arrows and the lighting of the warning signal 10. Turning the steering wheel also illuminates the warning signal, extinguishes the green arrows and then illuminates the proper direction arrows. Straightening out of the wheel extinguishes the direction arrows and warning signal and relights the green arrows.

Manipulation of the manual switch does not affect any of these operations but permits the giving of advance warning of a proposed turn at any desired time while driving straight ahead. The fact that the green arrows are not then extinguished indicates that the turn is not to be made immediately and the subsequent darkening of the red direction arrows followed by the lighting of the warning signal, the darkening of the green arrows, and the relighting of the red direction arrows gives a clear indication that the manoeuvre previously signalled is taking place. If the manual switch is not manipulated the advance warning is not given. Otherwise the operation is the same as described, the warning and actual turning signals being given when the steering wheel is swung.

What I claim is:

1. A direction signal system for automobiles comprising a signalling unit provided with visual signals to indicate respectively straight ahead driving, to warn of slowing down or stopping, and turning to the right and left, an individual electric lamp for illuminating each signal, a circuit for each lamp provided with a source of electricity, a switch common to said circuits operated by turning the steering wheel and provided with means for completing the circuit to the warning signal lamp when the steering wheel is slightly turned from the straight ahead driving position and then the circuit to the right or left direction signal lamp when the steering wheel is correspondingly turned to a greater degree, said switch being also provided with means for partially closing the circuit of the straight ahead signal when the steering wheel is in straight ahead driving position, a second switch provided with means for completing the partly closed circuit to the straight ahead signal lamp and also with means for completing the circuit to the warning signal lamp when the wheel is in straight ahead driving position.

2. A direction signal system for automobiles comprising a signalling unit provided with visual signals to indicate respectively straight ahead driving, to warn of slowing down or stopping, and turning to the right and left, an individual electric lamp for illuminating each signal, a circuit for each lamp provided with a source of electricity, a switch common to said circuits operated by turning the steering wheel and provided with means for completing the circuit to the warning signal lamp and then the circuit to the right or left direction signal lamp while a corresponding turn is being made, said switch being also provided with means for partially closing the circuit of the straight ahead signal lamp when the steering wheel is in straight ahead driving position, a second switch provided with means for fully completing the partly closed circuit to the straight ahead signal lamp and also with means for completing the circuit to the warning signal lamp when the wheel is in straight ahead driving position, and a third switch provided with manually operated means for completing the circuit to either the right or left turning signal lamp when said steering wheel is in straight ahead driving position without affecting the straight ahead signal circuit or the warning signal circuit and with means for returning it to inoperative position without further manual manipulation when the steering wheel is given a right or left turn corresponding to the direction previously indicated by the manual operation of the third switch.

3. A direction signal system for automobiles comprising a signalling unit provided with visual signals to indicate respectively straight ahead driving, to warn of slowing down or stopping, and turning to the right and left, an individual electric lamp for illuminating each signal, a circuit for each lamp provided with a source of electricity, a switch common to said circuits operated by turning the steering wheel and provided with means for completing the circuit to the warning signal lamp and then the circuit to the right or left direction signal lamp while a corresponding turn is being made, said switch being also provided with means for partially closing the circuit of the straight ahead signal lamp when the steering wheel is in straight ahead driving position, a second switch provided with means for fully completing the partly closed circuit to the straight ahead signal lamp and also with means for completing the circuit to the warning signal lamp when the wheel is in straight ahead driving position, a third manually operated switch provided with means for completing the circuit to either right or left turning signal lamp when said steering wheel is in straight ahead driving position without affecting the straight ahead signal circuit or the warning signal circuit, and means on said first mentioned switch for turning said last mentioned switch to its inoperative position when the wheel is turned sufficiently to cause said first mentioned switch to complete the circuit of the warning signal lamp.

JAMES P. McCREADY.